Figure 1A:
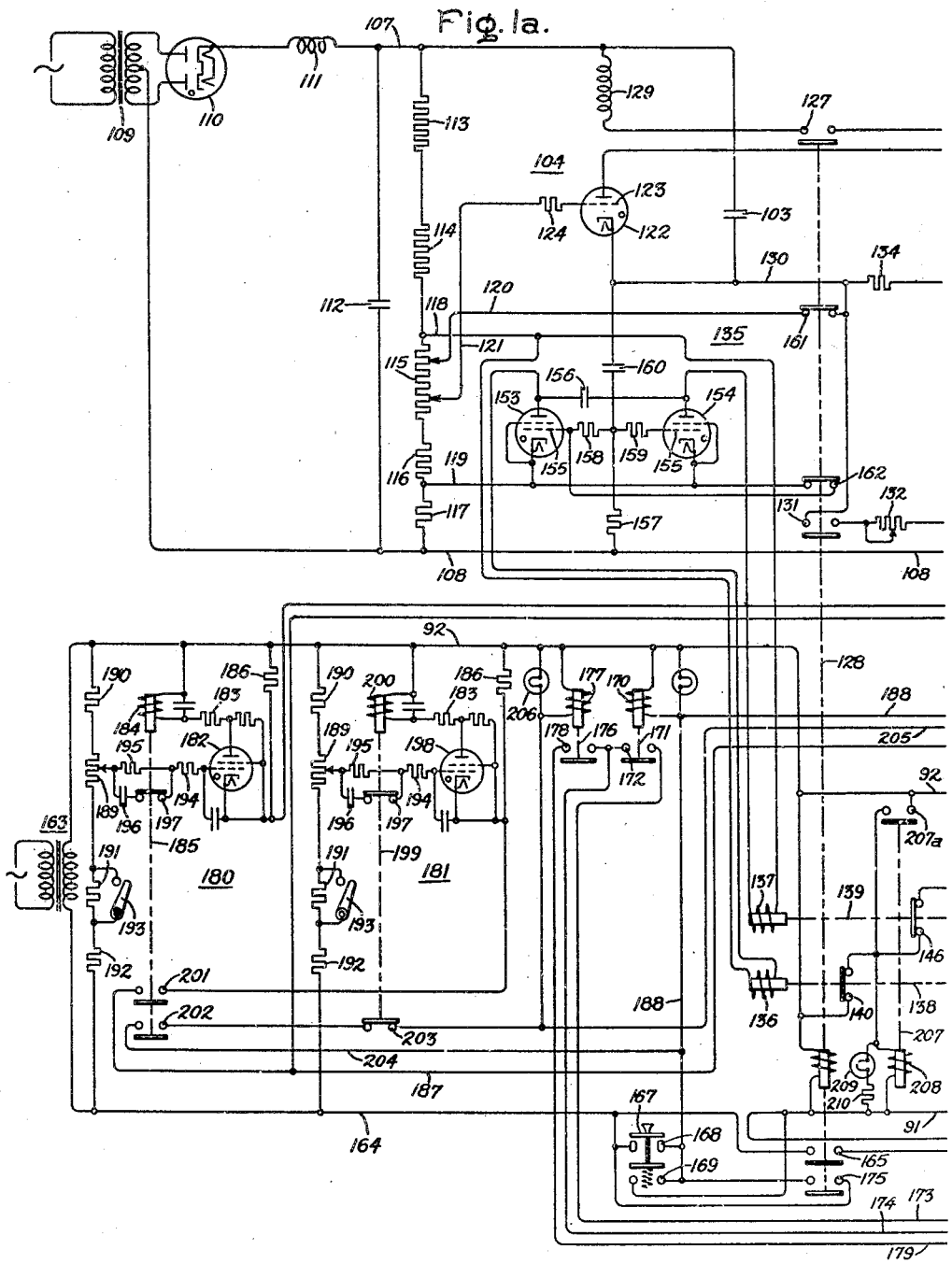

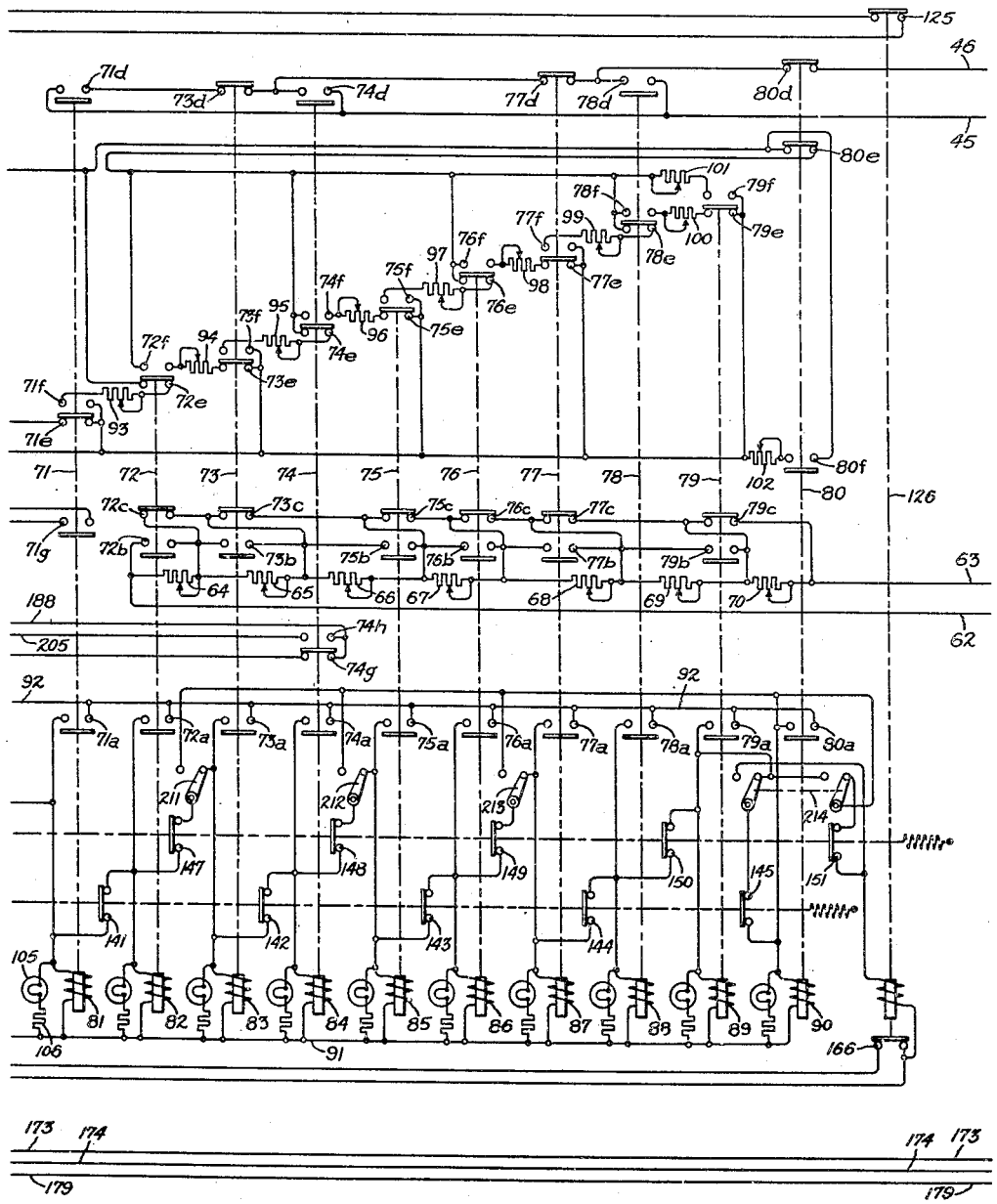

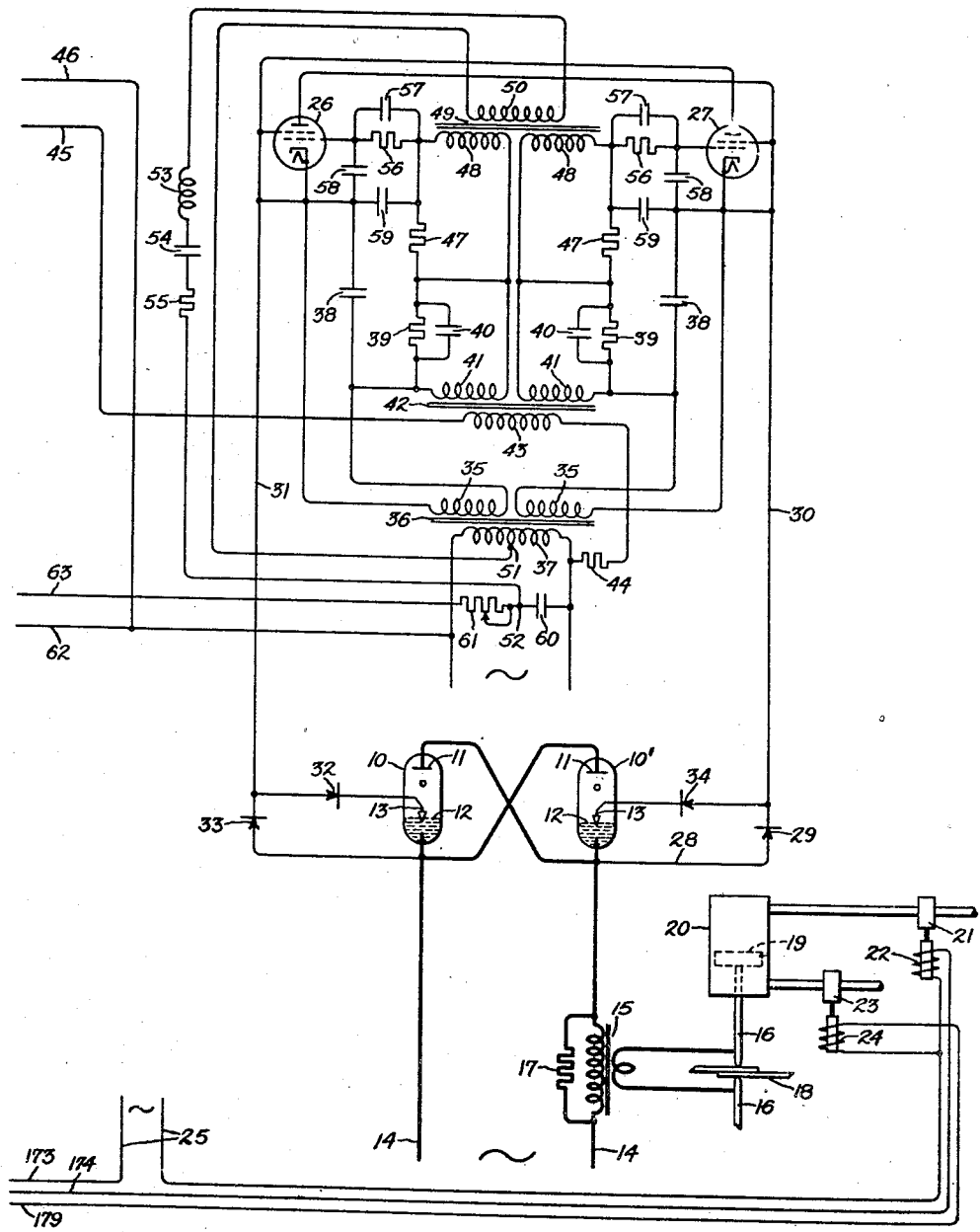

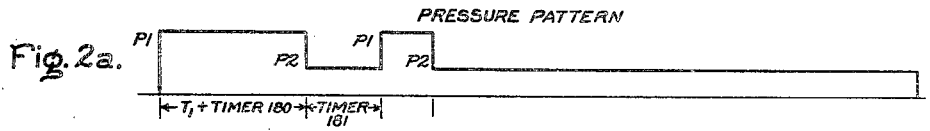
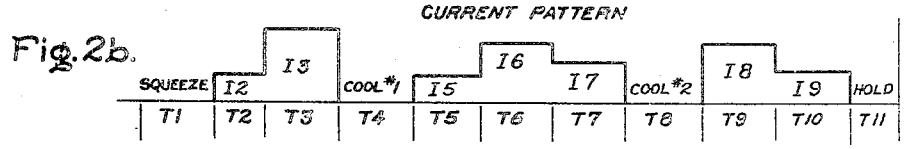
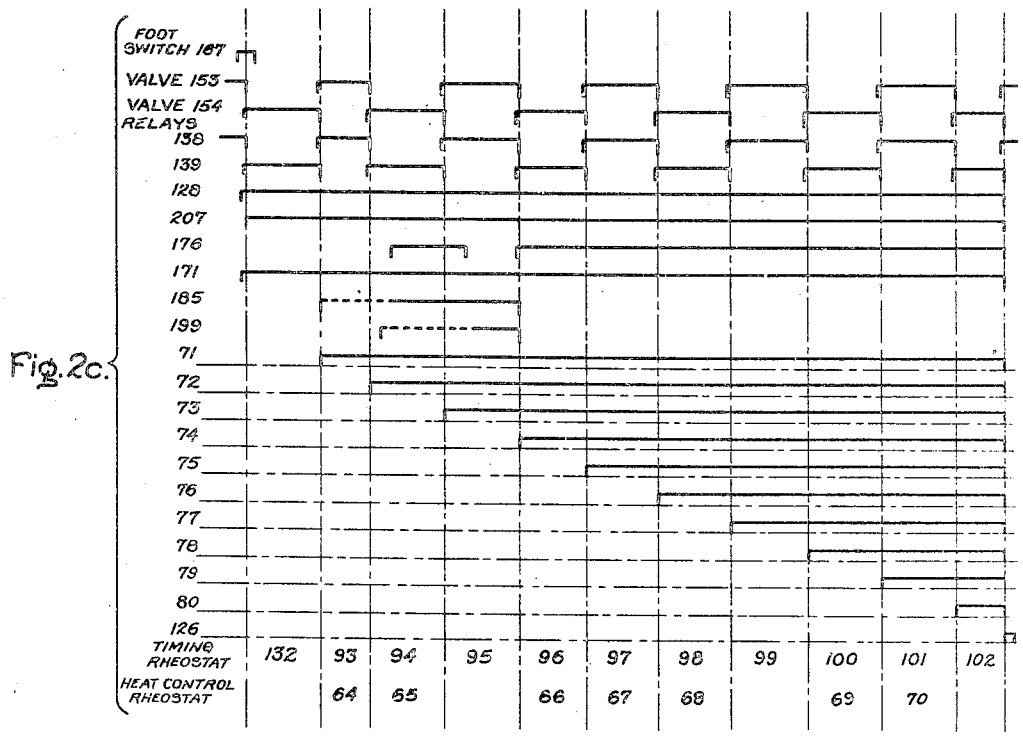
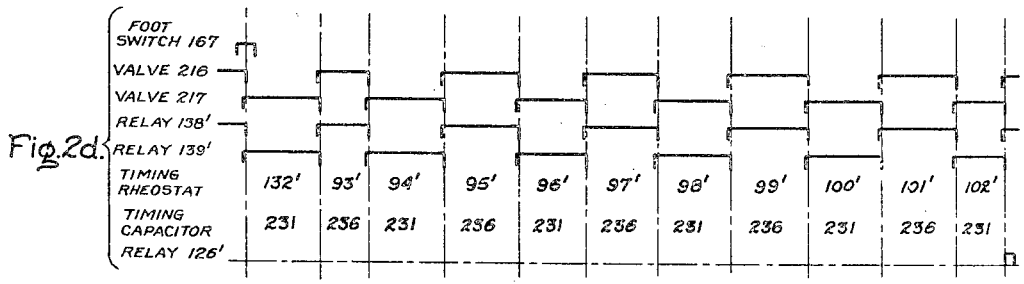

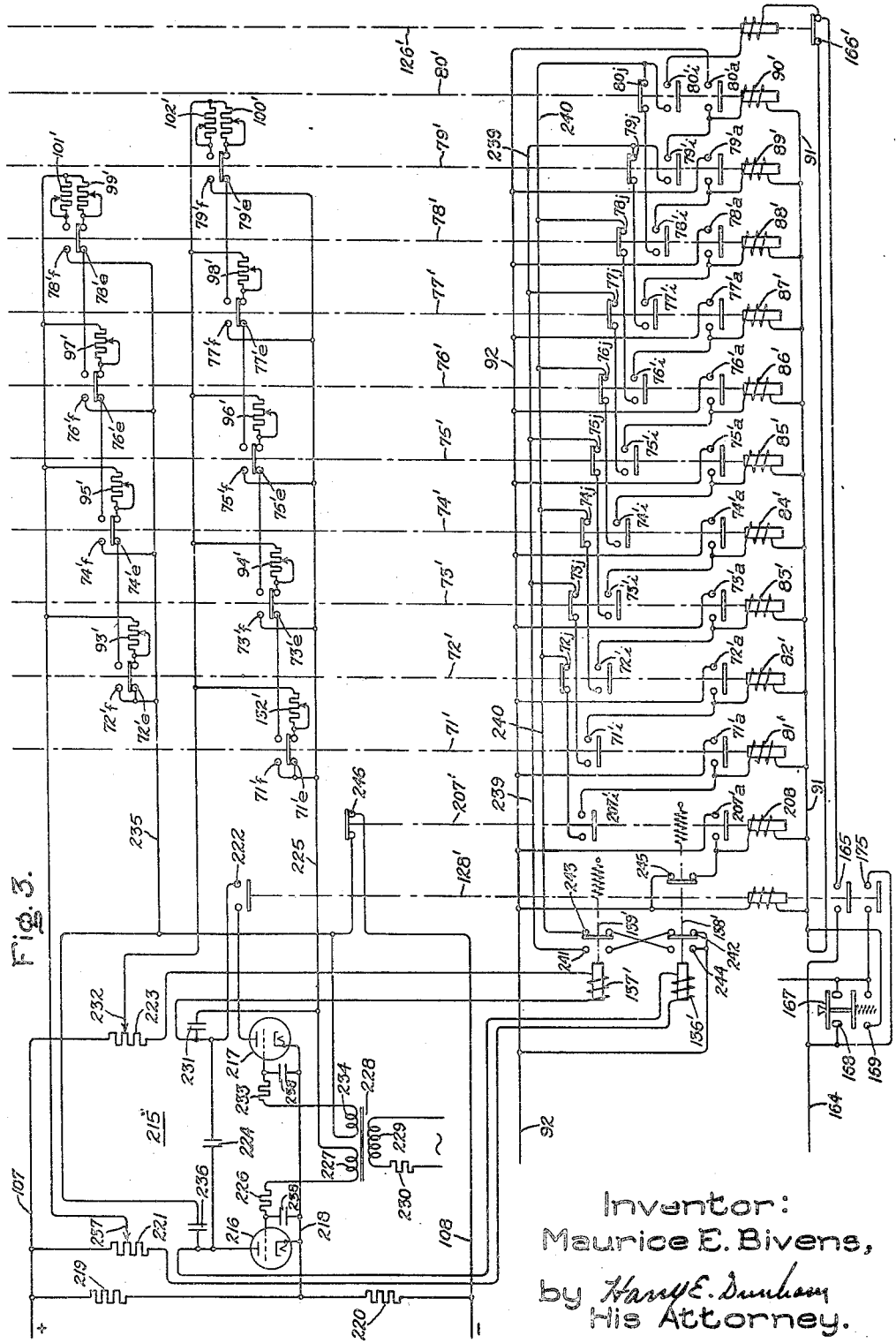

Patented Nov. 26, 1946

2,411,708

UNITED STATES PATENT OFFICE 2,411,708

ELECTRIC CONTROL CIRCUIT

Maurice E. Bivens, Schenectady, N. Y., assignor to General Electric Company, a corporation of New York Application April 8, 1944, Serial No. 530,136

19 Claims. (Cl. 171—97)

My invention relates to electric control circuits and more particularly to improved electric control circuits for effecting a plurality of circuit controlling operations in timed sequence.

While not limited thereto, my invention is particularly adapted for effecting the transmission of a predetermined current pattern to a resistance welding load in which a plurality of timed applications of current of different magnitudes are supplied to the load and are separated by periods of deenergization during which the work is allowed to cool. The current pattern may also be coordinated with a pattern of pressure according to which the work is subjected to different pressure levels during different timed intervals which may be adjusted in length independently of the intervals during which different levels of load current occur. Control circuits of this general type have been provided for effecting the transmission of a predetermined current pattern to a welding load circuit in which the periods of energization may be separated by an "off" or cool period, and one of these systems is described and claimed in my copending application Serial No. 460,240, filed September 30, 1942, and now Patent 2,390,982 granted December 18, 1945, and assigned to the assignee of the present invention. These prior systems have worked satisfactorily but as the number of different periods of the pattern have increased, the amount of equipment required has rendered the extension of these systems somewhat impracticable. In accordance with the teachings of my present invention, I provide an improved control circuit which is readily extended to provide any desired number of independently adjustable intervals with a minimum amount of equipment, and in which the flexibility of adjustment of the timed intervals and current levels is increased.

It is an object of my invention to provide a new and improved electric control circuit.

It is another object of my invention to provide a new and improved electric control system for effecting a predetermined pattern of circuit controlling operations at accurately timed intervals.

It is still another object of my invention to provide an improved control circuit for effecting a plurality of timed operations of independently adjustable duration which is characterized by the flexibility of control and the small amount of equipment required.

It is a still further object of my invention to provide a new and improved control system for providing a plurality of independently adjustable patterns of control, such as a current pattern and a pressure pattern for resistance welding systems, which are readily coordinated but which afford a maximum of flexibility with respect to independent adjustment.

In accordance with one of the illustrated embodiments of my invention, current is supplied to a resistance welding load by means of a pair of reversely connected electric valves preferably of the gaseous discharge type employing a liquid cathode. The periods of energization of the welding transformer are controlled by controlling the periods during which the electric valve means are conducting, and the level of current supplied to the load circuit is controlled by determining the instant in the anode-cathode voltage waves of the electric valve means that conduction is initiated. In accordance with this embodiment of my invention, the periods of energization of the load circuit are controlled by a group of control relays which selectively complete and interrupt the supply of a turn-on voltage component in the excitation circuit of the reversely connected electric valve means. This group of control relays also includes contacts for controlling the magnitude of the resistance in one arm of a bridge-type phase shifting network which controls the instant of initiation of conduction of the electric valve means. The operation of these relays is controlled by a novel timing circuit including a timer of the single-tube inverter type in which the magnitude of the resistance in circuit with a capacitor, which together determine the interval between successive operations of the electric valve of the inverter, is altered by operation of the same group of relays which controls the periods of conduction and instants of initiation of conduction of the reversely connected electric valve means. The successive operations of the single-tube inverter circuit effect the successive operation of these various control relays by means of a control circuit which is essentially a parallel-type inverter, the valves of which are normally biased negatively and which conduct alternately at instants determined by the conduction of the valve of the single-tube inverter. The alternate conduction of the valves of the parallel-type inverter effects alternate operation of a pair of control relays which control the energizing circuit of the group of relays which control the periods of energization and instants of initiation of conduction of the main electric valve means so that these latter relays are energized in succession, one for each conduction of the valve of the single-tube inverter timer. The pressure pattern is controlled by a pair of solenoid valves which are in turn controlled by a pair of independent electronic timers and which may, if desired, be interlocked with the relays controlling the current pattern to be supplied to the load circuit.

My invention will be better understood by reference to the following description taken in connection with the accompanying drawings, and its scope will be pointed out in the appended claims. In the drawings, Figs. 1a, 1b and 1c, considered together, are a schematic representation of one embodiment of my invention. Figs. 2a and 2b represent, respectively, pressure and current patterns that may be provided by the embodiment of my invention illustrated in Figs. 1a–1c and 3, and Figs. 2c and 2d indicate the operative condition of various elements of the circuit illustrated in Figs. 1a–1c and Fig. 3 during different portions of the current and pressure patterns illustrated in Figs. 2a and 2b. Fig. 3 is a schematic representation of a modification of a portion of the system illustrated in Figs. 1a–1c.

Referring now to Fig. 1c, I have shown my invention incorporated in a control system for controlling the conduction of a pair of electric valve means 10 and 10' which are preferably of the type employing a gaseous discharge and each includes an anode 11, a pool-type cathode 12 and a starting electrode 13. The electric valve means 10 and 10' are reversely connected in parallel between an alternating current supply circuit 14 and the primary winding of a resistance welding transformer 15 having the secondary winding thereof connected to the electrodes 16 of a resistance welding machine. A transient voltage limiting impedance 17 is connected across the primary winding of the welding transformer and may to advantage be a resistance having a nonlinear current resistance characteristic. As illustrated schematically, the pressure exerted on the work 18 by the electrodes 16 may be controlled by controlling the pressure exerted on a piston 19 working in a cylinder 20. As illustrated, the application of fluid pressure to the upper side of the piston is controlled by a solenoid valve 21 having an operating coil 22 and to the lower side of the piston by a second solenoid valve 23 having an operating coil 24. With this arrangement, two levels of pressure may be exerted on the work by selective energization of the coils 22 and 24. With coil 22 energized alone, pressure is transmitted only to the upper side of piston 19 and a high level of pressure is exerted on the work. When coils 22 and 24 are energized simultaneously, the net pressure on piston 19 is reduced and a lower level of pressure on the work is established. Control of the energization of coils 22 and 24 from a suitable source of alternating current 25 will be considered in detail at a later point in the specification.

The control circuit for supplying discharge initiating impulses to the control electrodes 13 of electric valves 10 and 10' will now be described. These impulses are transmitted to the control members 13 of valves 10 and 10' by a pair of excitation or firing valves 26 and 27, respectively. These valves are preferably of the hot cathode gaseous discharge type and are reversely connected in parallel in a manner similar to the main electric valves 10 and 10' and are energized respectively in accordance with the anode-cathode voltages of valves 10 and 10'. For example, the anode-cathode circuit of electric valve 26 may be traced from the anode of valve 10 through conductor 28, a unilaterally conducting device 29, conductor 30, the anode-cathode circuit of valve 26, conductor 31, unilaterally conducting device 32 to the cathode 12 of electric valve 10. The circuit of firing electric valve 27 may be traced in a similar manner and found to be connected between the anode and cathode of valve 10', through a circuit including unilaterally conducting devices 33 and 34. With this circuit it is apparent that the electric valves 10 and 10' will be rendered conducting during cycles of the supply circuit voltage and at instants during the cycles of the supply circuit voltage which coincide with the initiation of conduction of electric valves 26 and 27, respectively. Since the excitation circuits for electric valves 26 and 27 are identical, only one will be described and the same reference numerals will be applied to corresponding elements in the excitation circuit of the other valve. Considering valve 26, the cathode thereof is connected to the control member or grid through a circuit including four components of voltage. The first is an alternating current hold-off voltage supplied by the secondary winding 35 of a transformer 36 having a primary winding 37 energized from an alternating current supply which is synchronous with respect to the supply circuit 14 and preferably is energized from the supply circuit 14 through connections not shown. This component of voltage is impressed in the cathode to control member circuit of valve 26 across a capacitor 38. The second component of voltage is an alternating current turn-on voltage impressed on the grid circuit of valve 26 across the terminals of a parallel resistor 39 and capacitor 40 by the secondary winding 41 of a transformer 42 having the primary winding 43 thereof energized from the primary side of transformer 36 through a resistor 44, and through one or more of a plurality of relay contacts connected with conductors 45 and 46. The third component of voltage is impressed on the control member of valve 26 across the terminals of a resistor 47 by the secondary winding 48 of a saturable peaking transformer 49 having the primary winding 50 thereof energized from the terminals 51 and 52 of a static phase shifting circuit through a filter including a reactor 53 and a capacitor 54. A resistor 55 is also connected in series with the primary winding 50 of peaking transformer 49 to control the instant at which the transformer 49 saturates and the width of the secondary voltage peak produced by the transformer. A fourth component of voltage is impressed on the control member of valve 26 by a self-biasing circuit including a parallel resistor 56 and capacitor 57. Additional filter or transient suppressing capacitors 58 and 59 are also connected with the control member circuit of valve 26. The components of voltage impressed on the control members of valves 26 and 27 have such relative magnitudes that both the alternating current turn-on voltage supplied by transformer secondary windings 41 and the peaked voltage wave supplied by the transformer winding 48 are required to initiate conduction of the firing valves and as a result to initiate conduction of main electric valves 10 and 10'. Thus the periods during which the load circuit is energized are determined by controlling the intervals during which the transformer secondary windings 41 are energized and the instant during the cycles of supply circuit voltage at which valve means 10 and 10' are rendered conductive are determined by controlling the phase position of the peaked voltages of secondary windings 48. As indicated previously, the intervals during which transformer 42 is energized are determined by controlling the connection of conductor 45 with conductor 46. The phase position of the peaked voltages provided by transformer secondary windings 48 is determined by controlling the phase position of the voltage impressed on the terminals 51 and 52 by the phase shifting network including the arms of the midtapped transformer winding 37 of transformer 36, a capacitor 60, an adjustable resistor 61, and the magnitude of resistance included between conductors 62 and 63 which completes the fourth arm of the phase shifting network.

In accordance with important features of the present invention, improved control circuits are provided for controlling the connection of conductor 45 with conductor 46 to determine the periods of energization of the load circuit and for controlling the selective insertion of heat control rheostats 64–70, inclusive, between conductors 62 and 63 to complete the fourth arm of the static phase shifting circuit through different magnitudes of resistance. A group of electromagnetic relays 71–80, inclusive, are provided for selectively controlling the heat control rheostat which is effectively connected between conductors 62 and 63 and for controlling the connection of conductors 45 and 46 to determine the periods of energization of the load circuit to establish the current pattern indicated in Fig. 2b and including intervals designated T2–T11, inclusive. These relays are provided with operating coils 81–90, respectively, each having one terminal connected with an alternating current supply line 91 and another terminal arranged to be connected to a second alternating current supply line 92 through a sealing-in contact. These sealing-in contacts have been designated 71a to 80a, inclusive. Relays 72, 73, 75, 76, 77 and 79 are each provided with a pair of contacts designated 72b and 72c, etc., for controlling the heat control rheostats 64–70, inclusive. The "b" contacts of these latter relays are normally open and the "c" contacts are normally closed and are connected to control circuits in shunt with the respective heat control rheostats so that all but one of the rheostats is shunted from the circuit between conductors 62 and 63 at any one time. For example, before relay 72 picks up heat control rheostat 64 is connected between conductors 62 and 63. When relay 72 picks up, contact 72b closes and establishes a short circuit around heat control rheostat 64 and contact 72c opens to effectively connect rheostat 65 between conductors 62 and 63. As relays 73, 75, 76, 77 and 79 pick up in sequence, heat control rheostats 66, 67, 68, 69 and 70 are effectively connected in succession between conductors 62 and 63. Relays 71, 73, 74, 77, 78 and 80 are each provided with a "d" contact which is connected to control the circuit between conductors 45 and 46 to establish the periods of energization and deenergization of the load circuit as indicated in Fig. 2b for the periods from T2 to T11, inclusive. For example, closure of contacts 71d connects conductors 45 and 46 together to establish a period of energization. Contact 73d opens the circuit between conductors 45 and 46 when the relay 73 is energized. Similarly, contacts 74d and 78d are effective when relays 74 and 78 operate to connect conductors 45 and 46, and contacts 77d and 80d are effective to disconnect conductors 45 and 46 when relays 77 and 80, respectively, are energized. Each of the relays 71–80 is also provided with a normally closed "e" contact and a normally open "f" contact for controlling the sequential connection of the timing rheostats 93–102, inclusive, in circuit with a capacitance 103 of a single-tube type inverter or timing circuit designated generally by the numeral 104. Across the operating coil of each of the relays 71–80, inclusive, is connected an indicating lamp 105 and a series resistor 106 to provide a visual indication as the relays 71–80, inclusive, become energized to indicate the interval of the current pattern which is being supplied by the equipment at any time during its operation.

The manner in which the relays 71–80, inclusive, are energized in sequence at the beginning of the time intervals from T2 to T11, inclusive, will now be described. Referring now to the upper portion of Fig. 1a, a source of direct current control voltage is impressed across a pair of conductors 107 and 108 by the output of a biphase rectifier including a supply transformer 109 and an electric discharge device 110 having a pair of discharge paths. The direct current output of the rectifier is filtered by a series smoothing reactor 111 and a shunt filter capacitor 112. Voltage dividing resistors 113–117, inclusive, are connected in series across the conductors 107 and 108 to impress different levels of direct current voltage on conductors 118, 119, 120 and 121. Conductors 120 and 121 are connected by adjustable taps with the voltage dividing resistor 115 to provide adjustable levels of voltage.

The single tube inverter 104 includes an electric discharge valve 122, preferably of the gaseous discharge type, having a control member or grid 123 connected to conductor 121 through a current limiting resistor 124. The anode of the discharge device 122 is connected with the direct current supply conductor through a normally closed contact 125 of a resetting relay 126, a normally open contact 127 of an initiating relay 128 and a commutating reactor 129. The capacitor 103 of the single tube inverter circuit is connected between the direct current supply conductor 107 and conductor 130 which is connected with the cathode of the single tube inverter valve 122. Conductor 130 is arranged to be connected to the direct current supply conductor 108 by means of a normally open contact 131 of the initiating relay 128 through a circuit including a timing rheostat 132 and the normally closed contact 71e of relay 71. Rheostat 132 determines the timing of the interval T1 of the current pattern illustrated in Fig. 2b. Timing rheostats 93–102, inclusive, are arranged to be sequentially inserted in a circuit between the conductor 130 and the direct current conductors 108 as the relays 71–80, inclusive, are picked up in sequence. The circuit of the timing rheostats 93–102 also includes a fixed resistor 134.

In order to provide for the energization of only one additional relay of the group of relays 71—80, inclusive, for each conduction of the valve 122 of the timer circuit 104 I provide a control circuit 135 which is in general a parallel-type electric valve inverter which operates to energize alternately the operating coils 136 and 137 of relays 138 and 139 having contacts 140–145 and 146–151, inclusive. These contacts are connected to control the energization of the operating coils 81–90 of the relays 71–80 from the alternating current supply conductors 91 and 92 to effect the energization of only one additional relay for each conduction of the valve 122 of the timer 104. Referring now to the circuit 135, it comprises a pair of electric discharge devices 153 and 154, each preferably of the type employing an ionizable medium such as a gas or a vapor, and including a control member or grid 155. The cathodes of electric valves 153 and 154 are connected together and to the direct current supply conductor 119 and the anodes of these valves are connected to the direct current supply conductor 118 through the operating coils of relays 136 and 137, respectively, so that relay 138 is energized when valve 153 conducts and relay 139 is energized when valve 154 conducts. A commutating capacitor 156 is connected between the anodes of electric valves 153 and 154 to effect commutation of current between the valves as the control member of a nonconducting one of the valves is rendered positive. The control members 155 of electric valves 153 and 154 are normally maintained at a negative voltage with respect to the cathodes thereof by an amount equal to the voltage drop across voltage dividing resistor 117 by virtue of the connection of the control members with conductor 108 through a resistor 157 and the respective current limiting resistors 158 and 159. The control members 155 of electric valves 153 and 154 are rendered positive with respect to the cathodes thereof momentarily each time electric valve 122 is rendered conductive as a result of the connection between the cathode of electric valve 122 and the control members 155 through a circuit including a capacitor 160. Since the capacitor 160 cannot charge immediately when valve 122 conducts, the voltage of the control members 155 is rapidly raised to the voltage of conductor 107 when valve 122 conducts. The time constant of the circuit including capacitor 160 and resistor 157 is very small so that the voltage of capacitor 160 rapidly returns to the voltage of the conductor 108 and the positive impulse supplied to control members 155 is, therefore, of very brief duration. In order to establish an initial charge on the timing capacitor 103 of the single tube inverter a connection with the direct current supply conductor 120 is provided by a normally closed contact 161 of initiating relay 128. A normally closed contact 162 of the initiating relay 128 is provided to complete a connection between the control member 155 of electric valve 153 and the direct current conductor 119 to insure that electric valve 153 will be rendered conductive upon energization of the conductors 107 and 108 prior to operation of the initiating relay 128.

As previously mentioned, the control relays 71-80 are energized from alternating current supply conductors 91 and 92. Conductor 92 is energized directly from one terminal of the secondary winding of an alternating control voltage supply transformer 163, while the conductor 91 is energized from the other terminal of the secondary winding of transformer 163 through conductor 164, a normally open contact 165 on the initiating relay 128 and a normaly closed contact 166 on the resetting relay 126. The application of control power to conductor 91 is effected by closure of an initiating switch 167 which may be the foot switch of the welder and which, as illustrated, has two sets of normally open contacts 168 and 169. Contacts 168 close first and are used for applying pressure only and contacts 168 and 169 are both closed to place the system in operation for supplying both pressure and current to the electrodes. Contact 169 of initiating switch 167, when closed, connects conductor 164 with conductor 91, and contact 168 completes a circuit for the operating coil 170 of a pressure control relay 171 having one pair of normally open contacts 172 connected to energize the operating coil 22 of the high pressure solenoid 21 through conductors 173 and 174. Since the operating coil of initiating relay 128 is connected between conductors 91 and 92, it is energized immediately upon closure of the initiating switch 167 and closes its contact 165 to seal itself in and closes an additional normally open contact 175 to maintain the pressure control relay 171 energized. As pointed out earlier in the specification, the higher pressure is maintained on the welding electrodes at all times that the high pressure solenoid 21 alone is energized. When it is desired to reduce the pressure supplied to the electrodes, the operating coil 24 of solenoid valve 23 is energized to introduce a back pressure on the lower side of the operating piston 19. A second pressure control relay 176 having an operating coil 177 is provided with a normally open contact 178 which is connected to control the energization of the operating coil 24 from the alternating current source 25 through conductor 173, contact 172 of relay 171 and a conductor 179. For controlling the operation of the relay 176 to effect the application of lower pressure to the electrodes 16 during predetermined timed intervals, a pair of electronic timers illustrated generally by the numerals 180 and 181 are provided. These timers are of the general type described and claimed in Schneider Patent No. 2,171,347 dated August 29, 1939, and assigned to the assignee of the present invention. Referring particularly to the timer 180, it comprises an electric discharge valve 182 preferably of the gas-filled type and having the anode thereof connected with the alternating current supply conductor 92 through a resistor 183 and the operating coil 184 of a relay 185. The cathode of the electric valve 182 is connected to the same alternating current supply conductor as the anode through a resistor 186. The cathode is also connected to the alternating current supply conductor 164 through an initiating circuit including a normally open contact 71g of relay 71, conductor 187, a normally closed contact 74g of relay 74, conductor 188 and contact 175 of the initiating relay 128. The control member of valve 182 is connected to a point of adjustable alternating current voltage on a resistor 189 which is connected in series with voltage dividing resistors 190, 191 and 192 which are connected across the alternating current supply conductors 92 and 164. Resistor 191 is a range resistor for the control and is provided with a shunting switch 193. The circuit between control member of valve 182 and resistor 189 includes a current limiting resistor 194 and a timing resistor 195 which is shunted by timing capacitor 196 through a normally closed contact 197 of the relay 185. The timer 181 is in general the same as timer 180 and includes an electric discharge valve 198 and a relay 199 having the operating coil 200 connected in the anode-cathode circuit of the valve 198. The remainder of the elements of the control 181 correspond exactly to the elements of control 180 and have been designated by the same reference numerals. The initiating circuit for timer 181 connects the cathode of valve 198 with conductor 164 and includes a normally open contact 201 on relay 185, conductor 187, normally closed contact 74g of relay 74, conductor 188 and contact 175 of initiating relay 128. The relay 185 of timer 180 is provided with a second normally open contact 202 which establishes an energizing circuit for the operating coil 177 of relay 176 by completing a circuit from the lower terminal of the operating coil through a normally closed contact 203 on the relay 199 of timer 181, conductor 204 and a contact 175 of initiating relay 128. Thus relay 185 of timer 180 picks up to establish a circuit for pressure relay 176 and establish the first period of low pressure indicated in the pressure pattern of Fig. 2a. When relay 199 of timer 181 picks up, this circuit is interrupted by contact 203 to re-establish the period of high pressure. When relay 74 picks up, it closes its normally open contact 74h to establish an energizing circuit for relay 176 through a conductor 205, contact 74h, conductor 188 and contact 175 of initiating relay 128 to establish a second period of low pressure indicated in the pressure pattern of Fig. 2a. Indicating lamps 206 may be connected across the operating coils of relays 171 and 176 to indicate the level of pressure being applied to the work.

In order to provide an indication of the beginning of the timing interval of application of pressure to the electrodes, a relay 207 having an operating coil 208 is provided. The operating coil 208 has one terminal connected to the alternating current supply conductor 91 and the other terminal connected to the supply conductor 92 through a normally closed contact 140 of relay 138 so that relay 207 is energized as a result of deenergization of relay 138 upon the first conduction of timing valve 122. The relay 207 is provided with a sealing-in contact 207a. An indicating lamp 209 connected in series with resistor 210 across the operating coil indicates that the first interval of the pattern or T1 is in progress.

As indicated previously, the successive energization of relays 71 to 80 is accomplished by the alternate energization of relays 138 and 139 to produce the current pattern illustrated in Fig. 2b. In many applications it may be desirable to eliminate one or more of the intervals of the complete pattern and for this reason single pole, double throw switches 211, 212 and 213 and double pole, double throw switch 214 are provided. With all of these switches in the right-hand position as indicated, the complete pattern of Figs. 2a and 2b will be provided. By moving two or more of the switches to the left-hand position, one or more of the intervals may be eliminated as will be described in more detail in connection with the operation of the system.

In the interest of simplification, the supply of heating current for the filaments of the various electric discharge devices as well as the time delay relay circuit for preventing the application of anode-cathode voltage to these discharge devices before the cathode has reached proper operating temperature have been omitted from the drawings. It will be understood that these means would be provided in a physical embodiment of the circuit illustrated, and that the various alternating current supplies as indicated on the drawings would preferably be derived from the main alternating current supply circuit 14.

Although the operation of the system has been considered with the various components of equipment as they were described, it is believed desirable to consider briefly the operation of the system as a whole when functioning to supply the current and pressure patterns indicated in Figs. 2a and 2b. In following this description of the operation it will be helpful to follow the chart of Fig. 2c indicating the operative condition of the various relays, valves, timing resistors and heat control resistors of the system during the various time intervals of the current and pressure patterns. Let it be assumed that all of the supply circuits indicated on the drawing are energized and that the electric valves are in proper operating condition. Under these conditions, electric valve 153 is conducting and relay 138 is energized. The capacitor 103 of the timing circuit 104 is charged with the lower plate thereof at the voltage of the conductor 120. The control member of electric valve 122 is slightly negative with respect to the cathode but not sufficiently so to prevent conduction of valve 122 almost immediately upon completion of its anode-cathode circuit by the initiating relay 128. Under these initial conditions, the conductors 45 and 46 are open circuited by virtue of the open contact 71d of relay 71 to prevent conduction of current by the main electric valves 10 and 10'. When it is desired to initiate a welding operation, the switch 167 is closed. Closure of contacts 168 of switch 167 completes an energizing circuit for the operating coil 170 of relay 171 which through its contact 172 effects energization of the solenoid valve 21 from the alternating current supply 25 to establish pressure P1 on the electrodes as indicated in Fig. 2a. Also, upon operation of initiating switch 167, contact 169 is closed to complete an energizing circuit for the operating coil of initiating relay 128. Contacts 165 and 175 of relay 128 shunt the contacts of initiating switch 167 so that the foot switch may be released without interrupting the welding operation. Closure of initiating relay 128 also establishes the anode-cathode circuit of timing valve 122 through contact 127, disconnects the timing capacitor 103 from the direct current conductor 120, and connects the lower terminal of capacitor 103 with direct current conductor 108 through timing resistor 132. Contact 162 of relay 128 is opened to remove the bias voltage from the control member of valve 153 which rendered it initially conducting. Almost immediately upon operation of relay 128, tube 122 conducts to discharge the capacitor 103 to a voltage which is somewhat positive with respect to the direct current supply line 107 due to the oscillatory character of the circuit including capacitor 103 and reactor 129. As the voltage across the anode-cathode circuit of tube 122 reverses, conduction by tube 122 is terminated and the lower plate of capacitor 103 starts to charge to the voltage of the direct current supply lines 107 and 108 through the timing resistor 132 to establish the duration of the interval T1 of the current program.

At the instant that electric valve 122 became conductive the control members 155 of valves 153 and 154 were momentarily raised to a positive voltage by the coupling capacitor 160 connected between the cathodes of valve 122 and control members 155. The application of positive voltage to the control member of valve 154 in cooperation with the voltage of commutating capacitor 156, which has previously charged through the anode-cathode circuit of valve 153, effects the commutation of current from valve 153 to valve 154 to deenergize relay 138 and energize relay 139. The duration of the commutation and the operating characteristics of the relays 138 and 139 are such that both relays are maintained in the energized position for a short interval during commutation so that at no time are the contacts of both of these relays closed. This is indicated in Fig. 2c and is essential to insure that only one additional relay will be energized for each conduction of tube 122. As a result of the deenergization of relay 138, the operating coil 208 of relay 207 is energized through contact 140 and relay 207 is maintained closed by a holding circuit including the sealing-in contact 207a of the relay 207. This sealing-in contact also conditions the energizing circuit for the next relay to be operated, namely, relay 71, upon the next conduction of the timing valve 122. Thus the first conduction of valve 122 will take place substantially immediately upon closure of initiating relay 128 and effects energization of relay 207 which by indicating lamp 209 indicates that the squeeze period or interval T1 is in progress. Returning now to a consideration of the operation of the timing circuit 104, the lower plate of the capacitor 103, as previously indicated, charges through timing resistor 132 toward the voltage of conductor 108 and at a predetermined point in this charging operation, dependent upon the voltage of conductor 121 connected with control member 123, tube 122 is again rendered conductive with the interval between these first two conductions of valve 122 corresponding to T1 and being determined by the rheostat 132. When valve 122 conducts, the control members of valves 153 and 154 are again rendered momentarily positive and the current is commutated from tube 154 to tube 153 with the aid of commutating capacitor 156, and as a result relay 139 is deenergized and relay 138 is energized. Deenergization of relay 139 establishes an energizing circuit for operating coil 81 of relay 71 through its contact 146 and the sealing-in contact 207a of relay 207. Energization of relay 138 opens its contacts 140–145 to prevent the energization of more than one relay of the group 71–80 for this conduction of valve 122. Operation of relay 71 initiates a period of energization of the load circuit by closing contact 71d to connect conductors 45 and 46. The level of current I2 of Fig. 2b for this interval T2 of the pattern is determined by the magnitude of the resistance of the heat control rheostat 64 which is at this point in the program effectively connected between conductors 62 and 63. Operation of relay 71 also opens contact 71e and closes contact 71f to remove timing rheostat 132 from the circuit with timing capacitor 103 and to insert in place thereof timing resistor 93 which determines the rate at which capacitor 103 charges toward the voltage of conductor 108 and, therefore, determines the duration of interval T2 by determining the interval before the next conduction of valve 122.

Operation of relay 71 to the closed position also closes a contact 71g which initiates operation of the timer circuit 180 by connecting the cathode of valve 182 to the alternating current supply conductor 164. Relay 185 of timer 180 is energized an interval of time after this completion of the initiating circuit determined by the voltage to which capacitor 196 has previously been charged and the magnitude of discharge resistor 195. The capacitor 196 charges by grid rectification through a circuit including the slider on resistor 189, the grid-cathode circuit of valve 182 and resistor 186. As indicated in Fig. 2c, energization of the relay 185 of timer 180 effects energization of the pressure control relay 176 to energize the solenoid valve 23 and reduce the pressure applied to the work. For the particular pattern indicated, the time required for relay 180 to time out and pick up relay 185 is greater than the timed interval of the single tube inverter timer 104 so that a new current period T3 is initiated by the next conduction of valve 122 prior to the decrease in pressure to the level P2. The level of current I3 for the interval T3 is established by the magnitude of the heat control rheostat 65 which is effectively connected between conductors 62 and 63 upon energization of relay 72, it being noted that operation of the relay 72 to closed position shorts out rheostat 64 and opens the short circuit around rheostat 65. Contacts 72e and 72f also adjust the timing rheostat circuit of timer 104 by removing the control rheostat 93 and inserting the timing rheostat 94 which determines the duration of the interval T3. The operation of the single tube inverter circuit to cause alternate conduction by valves 153 and 154 continues at intervals determined by the timing rheostats 94–102, inclusive, and to effect the transmission of current to the load as indicated in Fig. 2b in accordance with which one of the rheostats 66–70 is connected between conductors 62 and 63. The "off" periods T4, T6 and T11 are introduced by the contacts 73d, 77d and 80d of relays 73, 77 and 80 since these contacts open the circuit between conductors 45 and 46 in response to energization of the respective relays.

Returning now to a consideration of the pressure timers 180 and 181, it will be noted that when relay 185 of timer 180 is energized it closes a contact 201 which establishes an initiating circuit of timer 181. This circuit may be traced from cathode of valve 198 of timer 181 through contact 201, conductor 187, contact 74g of relay 74, conductor 188, and contact 175 of relay 128 to conductor 164. This initiation of operation of timer 181 is indicated by the dotted line for relay 199 in Fig. 2c. When relay 199 is energized, opening of its contact 203 is effective to deenergize pressure control relay 176 and as a result to deenergize solenoid valve 23 and restore the high pressure level P1 to the electrodes. When relay 74 operates, opening of the normally closed contact 74g thereof resets both of the timers 180 and 181 and establishes the low value of pressure P2 by completing the energizing circuit for the pressure control relay 176 through contact 74h. As the current and pressure pattern proceeds from T2 to T11, relays 71 to 80 are picked up in sequence and remain energized. At the expiration of the next timing interval after energization of relay 80, as determined by the timing circuit 104 and timing resistance 102, the resetting relay 126 is energized to open its contacts 125 and 166 and thereby open the anode-cathode circuit of control valve 122 and to deenergize the operating coils of relays 128, 207 and 71–80, inclusive. Dropping out of relay 128 deenergizes the relay 126 and restores the system to its initial condition in which valve 153 is conducting and relay 138 is energized.

In order to render it possible to omit certain of the timing intervals from the complete pattern, I provide manual switches 211, 212, 213 of the single pole type and double pole switch 214. With these switches all in the right-hand position as indicated in the drawing, complete current and pressure patterns are supplied to the work. If any one of the switches 211–213 is moved to the left, the hold period is initiated immediately upon completion of the interval of the pattern controlled by the relay immediately to the left of the manual switch. For example, if switch 211 is moved to the left, the hold period follows immediately after the interval T3. If the double pole switch 214 is moved to the left, the hold period is omitted. It will be apparent that switches connected in accordance with the teachings of this disclosure may be arranged to omit any desired intervals from the complete pattern.

In Fig. 3 I have shown a modification of the timing and sequencing arrangement of Figs. 1a–1c. In order to simplify the drawings, only those parts of the system which differ from Fig. 1 have been illustrated and it will be understood that the remainder of the system of Fig. 1 would be employed in a complete embodiment. In the arrangement shown in Fig. 3, the functions of the timing circuit 104 and the control circuit 135 of Figs. 1a–1c have been incorporated in a single control circuit 215 which is energized from the direct current control voltage supply conductors 107 and 108. While this circuit 215 may be employed to control the same sequencing relay system shown in Figs. 1a–1c, I have illustrated a modification of this sequencing arrangement in Fig. 3 which requires less contacts on the relays which are alternately operated but which requires additional contacts on the relays which are energized in sequence. Referring now to Fig. 3, the circuit 215 includes a pair of electric discharge valves 216 and 217 having their anode-cathode circuits connected in parallel circuit relation for energization from the supply of direct current voltage provided by conductors 107 and 108. Referring to discharge device 216, the cathode thereof is connected to a conductor 218 which is maintained at a voltage intermediate the conductors 107 and 108 by voltage dividing resistors 219 and 220. The anode of valve 216 is connected with the conductor 107 through a circuit including the operating coil 136' of relay 138' and a resistor 221. In a similar manner, the cathode of discharge device 217 is connected with conductor 218 and the anode is connected with conductor 107 through a circuit including a normally open contact 222 of relay 128', the operating coil 137' of relay 139' and a resistor 223. A commutating capacitor 224 is connected between the anodes of the discharge devices 216 and 217 and cooperates with the control members thereof to effect commutation of current from one of the discharge devices to the other, and thereby to effect alternate energization of the operating coils 136' and 137' of the relays 138' and 139'. In order to control the interval between successive transfers of current from one of the discharge devices to the other, the control members of devices 216 and 217 are provided with energizing circuits having timing functions. The control member of valve 216 is connected with a conductor 225 through a current limiting resistor 226 and a secondary winding 227 of a transformer 228 which is preferably of the saturable inductive type for producing voltages of peaked wave form. The primary winding 229 of transformer 228 is energized from a source of alternating current voltage through a resistor 230. The conductor 225 is connected with the circuit controlled by the anode-cathode of electric discharge device 217 by a capacitor 231 and through a parallel circuit to an adjustable point on the resistor 223 determined by the movable tap 232. This parallel circuit includes one of the resistors 132', 94', 96', 98', 100' or 102' dependent upon the operative position of the sequencing relays 71' to 79', inclusive. In a similar manner, the control member of electric valve 217 is connected through a current limiting resistor 233, a secondary winding 234 of synchronizing transformer 228 to a conductor 235. This conductor is connected to the anode of electric valve 216 through a capacitor 236 and through a parallel circuit to an adjustable point on resistor 221 determined by the position of the slider 237. This parallel circuit includes one of the resistors 93', 95', 97', 99' or 101', dependent upon the operative position of the sequencing relays 72'–78'. Suitable transient suppressing capacitors 238 are preferably connected between the control members and cathodes of the respective discharge devices 216 and 217. Before describing the operation of the timing circuit 215 to effect alternate energization of the operating coils 136' and 137' of relays 138' and 139', the control circuits of the sequencing relays will be described. Relays 71'–80', inclusive, 126', 128' and 207' correspond generally to the relays designated by the same unprimed numbers in the arrangement described in Figs. 1a–1c and control the same periods of the pattern in the same manner. The energizing circuits for these relays are slightly different in the arrangement shown in Fig. 3. In Fig. 3, one terminal of the operating coil of each of these relays is energized from the alternating current supply conductor 164, through a normally closed contact 166' of relay 126' and conductor 91. The other terminal of each of the operating coils is maintained energized through its sealing-in contact or "a" contact which completes a circuit from the other terminal of the operating coil to the conductor 92. The relays are picked up in sequence through a circuit including one of a pair of conductors 239 and 240 which are arranged to be energized alternately from the supply conductor 92 through the contacts of relays 138' and 139'. As indicated, conductor 239 is connected with conductor 92 through normally open contact 241 of relay 139' and a normally closed contact 242 of relay 138', and conductor 240 is connected with supply conductor 92 through a normally closed contact 243 on relay 139' and a normally open contact 244 on relay 138'. With this arrangement only one of the conductors 239 or 240 is energized at one time dependent upon which of the relays 138' or 139' is deenergized. Each of the sequencing relays 71'–80' includes in addition to its seal-in or "a" contact a normally open i contact and relays 72'–80', inclusive, a normally closed j contact. The i contact conditions the initiating circuit for the next relay in the sequence and the j contact interrupts the circuits of the energizing coils with conductors 239 and 240 to prevent these latter conductors from being connected directly with the supply conductor 92 through the seal-in contacts of the relay, which have been picked up, since such a connection between supply conductor 92 and either of conductors 239 and 240 would render relays 138' and 139' ineffective. Relay 138' is provided with an additional normally closed contact 245 for initiating energization of relay 207', and relay 207' is provided with a normally open contact 207'i which conditions the initiating circuit of relay 71' in the same manner that the i contacts of the remainder of the sequencing relays condition the energizing circuit for the next succeeding relay to be operated. Relay 207' is also provided with a normally closed contact 246 which initially impresses a negative bias of voltage dividing resistor 220 on the control member of electric valve 217. This bias maintains electric valve 217 nonconductive until the first synchronizing voltage peak of winding 234 occurring after closure of contact 222.

The manner in which the arrangement of Fig. 3 functions and the features which distinguish it from the arrangement of Figs. 1a–1c will be better understood by a brief consideration of the sequence of operations which take place in supplying a pattern of weld current to the load circuit. With conductors 107 and 108 energized and before closure of initiating switch 167, electric discharge valve 216 is conducting thus maintaining relay 138' energized. During conduction of electric valve 216 capacitor 231 charges through the grid-cathode circuit thereof until the voltage of the right-hand plate of the capacitor is essentially at the voltage of conductor 218. When it is desired to initiate a period of energization of the load circuit, manual switch 167 is closed and closure of contact 168 initiates a supply of pressure to the electrodes in the manner described in connection with Figs. 1a–1c. Closure of contact 169 operates initiating relay 128' which closes contacts 165 and 175 to establish sealing-in circuits around contacts 168 and 169. Closing of relay 128' also closes contact 222 to establish the anode-cathode circuit of electric valve 217. Electric valve 217 conducts upon the occurrence of the next positive peak of voltage supplied by synchronizing transformer winding 234 which is synchronous with the alternating current supply voltage of the welding system. Conduction by discharge device 217 energizes the operating coil of relay 139' and effects the transfer of current to discharge device 217 with the aid of commutating capacitor 224, interrupting the flow of current in discharge device 216 to deenergize relay 138'. Dropping out of relay 138' closes contact 245 to energize relay 207' which seals itself in through its contacts 207'a and conditions an energizing circuit for the operating coil of relay 71' by closure of its contacts 207'i. At the end of a timing period determined by the interval required for the capacitor 231 to charge through resistor 132' to such a voltage that the next positive peak of the synchronizing transformer winding 227 renders electric valve 216 conductive, current is transferred from valve 217 to valve 216 to energize relay 138' and deenergize relay 139', thereby closing contacts 243 and 244, respectively, to energize conductor 240 from supply conductor 92. This completes an energizing circuit for the operating coil 81' of relay 71' from conductor 240 through the j contact of relay 72', the i contact of relay 207' to the conductor 91. During conduction by valve 217 capacitor 236 charges through the grid-cathode circuit thereof so that the right-hand plate thereof is substantially at the voltage of conductor 218. The duration of the second interval T2 is determined by the time required for capacitor 236 to charge through resistor 93' and conductor 237 to such a voltage that the next positive peaked voltage of winding 234 renders electric discharge device 217 conductive. The successive energization of relays 71'–80' proceeds at intervals determined by the charging time of capacitors 231 and 236 as controlled by resistors 132' and 93'–102' until resetting relay 126' is energized to reset the relays and restore the system to its initial condition with valve 216 and relay 138' energized. The operative conditions of valves 216 and 217 and relays 138' and 139' as well as the effective timing resistor and timing capacitor are indicated in Fig. 2d for each interval of the current pattern of Fig. 2b. The remaining relay operations are indicated in Fig. 2c for the corresponding relays in Figs. 1a–1c. In this description of Fig. 3 no reference has been made to the control of the heat control rheostats or the timing circuit including conductors 45 and 46. It will be understood that the relays are provided with b, c and d contacts for controlling these circuits in the same manner as described in connection with Figs. 1a–1c. It will also be apparent that the pressure program may be coordinated by the g and h contacts on relays 71' and 74' in the same manner as it is in the system of Figs. 1a–1c.

From the description of the operation of the illustrated embodiments of my invention, it will be apparent that a large number of intervals are established during which currents and pressures of different levels are applied to the work circuit, and that the duration of the intervals as well as the levels of current may be adjusted with the greatest flexibility and at the same time the equipment required is very simple considering the variety of current and pressure patterns made available by the control.

While I have shown and described particular embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In combination, a pair of electric discharge devices each including an anode, a cathode and a control member, a pair of electromagnetic circuit controlling devices each including an operating coil, a supply of direct current voltage, said operating coils and said discharge devices being connected to provide two circuits energized in parallel from said direct current supply with each circuit including one of said operating coils and the anode-cathode circuit of one of said discharge devices in series, timing means connected with the control members of said discharge devices for modifying the voltage thereof to effect transfer of current from one of said discharge devices to the other at intervals and thereby effect alternate energization of said operating coils, said timing means including capacitance and resistance, and means responsive to the alternate operation of said circuit controlling devices for changing the effective magnitude of the resistance of said timing means to establish the duration of said intervals at different values in accordance with a predetermined time pattern.

2. In combination, a pair of electric discharge devices each including an anode, a cathode and a control member, a pair of electromagnetic circuit controlling devices each including an operating coil, a supply of direct current voltage, said operating coils and said discharge devices being connected to provide two circuits energized in parallel from said direct current supply with each circuit including one of said operating coils and the anode-cathode circuit of one of said discharge devices in series, timing means connected with the control members of said discharge devices for modifying the voltage thereof at intervals to effect transfer of current from one of said discharge devices to the other at the end of each of said intervals and thereby effect alternate energization of said operating coils, said timing means including a capacitance and a plurality of resistances of different pre-established magnitudes, and means responsive to the alternate operation of said circuit controlling devices for connecting different ones of said resistances in circuit with said capacitance to establish the duration of said intervals at different values.

3. In combination, a pair of electric discharge devices each including an anode, a cathode and a control member, a supply of direct current voltage, the anode-cathode circuits of said discharge devices being connected in parallel circuits for energization from said supply of direct current voltage, timing means connected with the control members of said discharge devices for modifying the voltage thereof at intervals to effect transfer of current from one of said discharge devices to the other at the end of each of said intervals, said timing means including capacitance and resistance, a pair of electromagnetic circuit controlling devices each including an operating coil, means for effecting alternate energization of said operating coils in response to the alternate conduction of current in said parallel paths, and means controlled by the alternate operation of said circuit controlling devices for establishing different preset values of resistance in said timing means to establish the duration of the successive intervals in accordance with a pre-established pattern.

4. In combination, a pair of electric discharge devices each including an anode, a cathode and a control member, a supply of voltage, the anode-cathode circuits of said discharge devices being connected in parallel circuit relation for energization from said supply of voltage, timing means connected with the control members of said discharge devices for modifying the voltage thereof at intervals to effect transfer of current from one of said discharge devices to the other at the end of each of said intervals, said timing means including a capacitor and a plurality of resistors each having a pre-established value and circuit controlling means controlled in response to the transfer of current from one of said discharge devices to the other for effecting the sequential connection of said resistors in circuit with said capacitance to determine the interval required for said capacitance to charge from one predetermined value of voltage to another and thereby determine the duration of the intervals between successive transfers of current from one of said discharge devices to the other.

5. In combination, a pair of electric discharge devices each including an anode, a cathode and a control member, a supply of direct current voltage, the anode-cathode circuits of said discharge devices being connected in parallel circuit relation for energization from said supply of direct current voltage, timing means connected with the control members of said discharge devices for modifying the voltage thereof at intervals to effect transfer of current from one of said discharge devices to the other at the end of each of said intervals, said timing means including a capacitor and a plurality of resistors each having a pre-established value, a plurality of circuit controlling means controlled in response to the transfer of current from one of said discharge devices to the other and operated in sequence, one for each transfer of current between said discharge devices, for effecting the sequential connection of said resistors in circuit with said capacitance to determine the interval required for said capacitance to charge from one predetermined value of voltage to another and thereby determine the duration of the intervals between successive transfers of current from one of said discharge devices to the other.

6. In combination, a pair of electric discharge devices each including an anode, a cathode and a control member, a supply of voltage, the anode-cathode circuits of said discharge devices being connected in parallel circuit for energization from said supply of voltage, timing means connected with the control members of said electric discharge devices for modifying the voltage thereof at intervals to effect transfer of current from one of said discharge devices to the other at the end of each of said intervals, said timing means including capacitance and resistance, a pair of electromagnetic circuit controlling devices each including an operating coil, means for effecting alternate energization of said operating coils in response to the alternate conduction of current in said parallel paths, a plurality of relays each including an operating coil, means for energizing an additional one of said relays for each transfer of current between said discharge devices including contacts of said circuit controlling devices and contacts on said relays, and means responsive to the successive operation of said relays for establishing different preset values of resistance in said timing means and thereby establish the duration of the successive intervals in accordance with a pre-established time pattern.

7. In combination, a supply circuit, a load circuit, electric translating apparatus interconnecting said circuits and a control means for controlling said translating apparatus to effect the transmission of a pattern of current to said load circuit having a plurality of intervals of different durations during which currents of different levels are supplied to said load circuit, said control means including a first control circuit for determining the intervals during which said load is energized, a second control circuit including a plurality of impedances of different predetermined magnitudes for establishing different levels of current to be supplied to said load circuit during different ones of said intervals, a timing circuit for establishing the duration of said intervals including a plurality of resistances of different predetermined magnitudes, and a plurality of circuit controlling means connected to be controlled in response to the operation of said timing means and to operate in succession one for each successive operation of said timing means to connect different ones of said resistances in said timing circuit in succession to determine the duration of the successive intervals of the pattern, said circuit controlling means being provided with circuit controlling elements connected in either said first or second control circuits to establish which ones of said intervals that said load is energized and to establish the level of current supplied to the load during each interval of energization by controlling the effective impedances in said second control circuit.

8. In combination, a supply circuit, a load circuit, electric translating apparatus interconnecting said circuits and a control means for controlling said translating apparatus to effect the transmission of a pattern of current to said load circuit having a plurality of intervals of different durations during which currents of different levels are supplied to said load circuit, said control means including a first control circuit for determining the intervals during which said load is energized, a second control circuit for establishing different levels of current to be supplied to said load circuit during different ones of said intervals, a timing circuit for establishing the duration of said intervals including a plurality of resistances of different predetermined magnitudes and a plurality of circuit controlling means connected to be controlled in response to the operation of said timing means to operate in succession, one for each successive operation of said timing means, to connect different ones of said resistances in said timing circuit in succession to determine the duration of the successive intervals of the pattern, said circuit controlling means being provided with circuit controlling elements connected in either said first or second control circuits to establish which of said intervals that said load is energized and to establish the level of current supplied to the load during each interval of energization.

9. In combination, an alternating current supply circuit, a load circuit, electric translating apparatus interconnecting said circuits including electric valve means having a control member, a first circuit for controlling the energization of said control member to control the cycles of said supply circuit during which said valve means is conducting to determine the periods of energization of said load circuit, a second control circuit for controlling the energization of said control member to determine the instant in the voltage wave of said supply circuit that said valve means is rendered conducting to determine the level of current supplied to said load circuit during each period of energization, said second control circuit including a plurality of impedance elements and circuit controlling means for selectively connecting said impedance elements in said second control circuit, a timing circuit for effecting operation of said circuit controlling means in sequence and for effecting the selective establishment of said first control circuit to effect the transfer of a predetermined pattern of current to said load circuit including a plurality of periods of energization and at least one intermediate period of deenergization, said timing means including an electric discharge device and a plurality of resistance-capacitance combinations for controlling the duration of the intervals between successive conductions of said device, and means responsive to the successive conductions of said discharge device for controlling the establishment of said first control circuit, for controlling the circuit controlling means of said second control circuit and for effecting successive alterations of said resistance-capacitance combinations to establish the duration of the successive intervals of said pattern.

10. In combination, an alternating current supply circuit, a resistance welding load circuit including a pair of electrodes, electric translating apparatus interconnecting said supply circuit and said electrodes to effect the transmission of a predetermined pattern of current to said electrodes including electric valve means having a control member, electrically controlled means associated with said electrodes for controlling the application of pressure to said electrodes, an excitation circuit for controlling the energization of said control member to determine the periods of energization of said load circuit and the levels of current supplied to said load circuit during each period of energization thereof, timing means for effecting a plurality of switching operations in definite timed sequence to control said excitation circuit to establish the periods of deenergization of said load circuit and to establish the different levels of current to be supplied to said load circuit during each interval of energization thereof, and additional timing means controlled in response to operation of the timing means for controlling the current pattern for effecting selective control of the electrically controlled means associated with said electrodes to establish periods during which pressures of different magnitudes are impressed on said electrodes, said last mentioned timing means being independently adjustable with respect to the timing means for controlling the current pattern so that the changes in pressure are accomplished at instants which are independent of the instants that changes in load current are effected but in definite timed relation with respect thereto.

11. In combination, a pair of electric discharge devices each including an anode, a cathode and a control member, a supply of direct current voltage, the anode-cathode circuits of said discharge devices being connected in parallel circuits for energization from said supply of direct current voltage, a timing circuit connected with the control member of each of said discharge devices and each including a capacitor connected between the control member of one of said discharge devices and a point the potential of which is controlled by conduction of the other of said discharge devices, so that the time required for the capacitor associated with the control member of one of said discharge devices to charge to a voltage which will render said one of said discharge devices conductive is determined by the magnitude of the resistance connected therewith and the level of voltage of the point to which it is connected, means controlled by the transfer of current from said one of said discharge devices to the other to effect a change in the magnitude of the resistance connected in circuit with the control member of the other of said discharge devices to control the time required for a subsequent transfer of current between said discharge devices, and circuit controlling means energized in response to the alternate conduction of current by said discharge devices for effecting a sequence of circuit controlling operations at intervals the duration of which are determined by the magnitudes of resistance in the timing circuits connected with said control members.

12. A circuit for effecting a plurality of circuit controlling operations in sequence at different predetermined intervals comprising a supply of direct current voltage, a pair of electric discharge devices each including an anode, a cathode and a control member, means connecting the anode-cathode circuits of said devices in parallel circuit relation for energization from said supply circuit, commutating means interconnecting said anode-cathode circuits, a capacitor for controlling conduction of one of said devices having one terminal connected with the control member thereof and the other terminal connected with the anode circuit of the other of said devices, a second capacitor for controlling conduction of the other of said devices having one terminal connected with the control member of said other device and a second terminal connected with the anode circuit of said one device, said capacitors cooperating with said commutating means to effect the transfer of current from one of said devices to the other, a plurality of circuits connected with the terminal of each of said capacitors connected to said control members and points of potential which are substantially more positive than the cathodes of said devices, said circuits including circuit controlling means operable to change an electrical characteristic of said circuits to adjust the interval required for said capacitors to charge from one predetermined voltage to another and thereby determine the interval of time between successive transfers of current between said devices, and means responsive to the successive transfers of current between said devices for operating said circuit controlling means in sequence to establish the duration of a subsequent timing interval for each transfer of current between said devices.

13. A circuit for effecting a plurality of circuit controlling operations in sequence at different predetermined intervals comprising a supply of direct current voltage, a pair of electric discharge devices each including an anode, a cathode and a control member, means connecting the anode-cathode circuits of said devices in parallel circuit relation for energization from said supply circuit, commutating means interconnecting said anode-cathode circuits, a capacitor for controlling conduction of one of said devices having one terminal connected with the control member thereof and the other terminal connected with the anode circuit of the other of said devices, a second capacitor for controlling conduction of the other of said devices having one terminal connected with the control member of said other device and a second terminal connected with the anode circuit of said one device, said capacitors cooperating with said commutating means to effect the transfer of current from one of said devices to the other, circuits connected with the terminals of said capacitors connected to said control members for establishing charging circuits for said capacitors to a point of potential which is substantially more positive than the cathodes of said devices, said circuits including circuit controlling means operable to change an electrical characteristic of said circuits to adjust the interval required for said capacitors to charge from one predetermined voltage to another and thereby determine the intervals of time between successive transfers of current between said devices, and means responsive to the transfer of current between said devices for operating said circuit controlling means to condition said circuits for a subsequent timing interval.

14. In combination, means for establishing a supply of direct current voltage including a plurality of points of different voltage, a timing circuit of the single tube inverter type including an electric valve having an anode, a cathode and a control member, means connecting said anode to a point of relatively positive voltage, means for connecting said cathode to a point of relatively negative voltage through a circuit including a timing resistance, means for establishing said control member at a voltage intermediate said points, a capacitor connected in parallel circuit relation with respect to the anode-cathode circuit of said valve so that said capacitor discharges rapidly through the anode-cathode circuit of said valve when said valve conducts and so that the charging of said capacitor through said resistance determines the interval between successive conductions by said valve, a pair of electric discharge devices connected across a portion of said supply of direct current voltage in parallel circuit relation, each of said devices including a control member, means for impressing a voltage on the control members of said discharge devices to maintain said devices nonconducting, a capacitor connecting said control member with the cathode circuit of said electric valve to impress a positive voltage impulse on the control members of said discharge devices in response to each conduction of said electric valve, and commutating means for effecting transfer of current from one of said discharge devices to the other for each of said voltage impulses.

15. In combination, means for establishing a supply of direct current voltage including a plurality of points of different voltage, a timing circuit of the single tube inverter type including an electric valve having an anode, a cathode and a control member, means connecting said anode to a point of relatively positive voltage, means for connecting said cathode to a point of relatively negative voltage through a circuit including a timing resistance, means for establishing said control member at a voltage intermediate said points, a capacitor connected in parallel circuit relation with respect to the anode-cathode circuit of said valve so that said capacitor discharges rapidly through the anode-cathode circuit of said valve when said valve conducts and so that the charging of said capacitor through said resistance determines the interval between successive conductions by said valve, a pair of electric discharge devices connected across a portion of said supply of direct current voltage in parallel circuit relation, each of said devices including a control member, means for impressing a voltage on the control members of said discharge devices to maintain said devices nonconducting, a capacitor connecting said control members with the cathode circuit of said electric valve to impress a positive voltage on the control members of said discharge devices in response to each conduction of said electric valve, and means controlled by the transfer of current from one of said discharge devices to the other for changing the effective value of said timing resistance to establish different intervals of time between successive conductions of said electric valve.

16. In combination, means for establishing a supply of direct current voltage including a plurality of points of different voltage, a timing circuit of the single tube inverter type including an electric valve having an anode, a cathode and a control member, means connecting said anode to a point of relatively positive voltage, means for connecting said cathode to a point of relatively negative voltage through a circuit including a timing resistance, means for establishing said control member at a voltage intermediate said points, a capacitor connected in parallel circuit relation with respect to the anode-cathode circuit of said valve so that said capacitor discharges rapidly through the anode-cathode circuit of said valve when said valve conducts and so that the charging of said capacitor through said resistance determines the interval between successive conductions by said valve, a pair of electric discharge devices connected across a portion of said supply of direct current voltage in parallel circuit relation, each of said devices including a control member, means for impressing a voltage on the control members of said discharge devices to maintain said devices nonconducting, means connecting said control members with the circuit of said electric valve to impress a positive voltage on the control members of said discharge devices in response to each conduction of said electric valve, commutating means for effecting transfer of current from one of said discharge devices to the other for each conduction of said electric valve, a pair of relays each having an operating coil, means connecting said operating coils to be energized alternately in response to the alternate conduction by said discharge devices, a plurality of circuit controllers to be operated in sequence, energizing circuits for said circuit controllers, and means including contacts on said relays and means controlled by one of said circuit controllers for effecting operation of an additional one of said circuit controllers for each transfer of current between said discharge devices.

17. In combination, a supply of direct current voltage including means for establishing a plurality of points of different voltage levels, a timing circuit of the single tube inverter type including an electric valve having an anode, a cathode and a control member, means connecting said anode with a point of relatively positive voltage and means for connecting said cathode to a point of relatively negative voltage through a circuit including a timing resistance, means for connecting said control member to a point having a voltage intermediate the voltages of said points, a capacitor connected in parallel circuit relation with respect to the anode-cathode circuit of said valve so that said capacitor discharges rapidly through the anode-cathode circuit of said valve when said valve conducts and so that the charging of said capacitor through said timing resistance from one predetermined voltage to the other determines the interval between successive conductions of said valve, and circuit controlling means operated in response to the successive conductions of said valve for effecting switching operations in timed sequence in accordance with a predetermined timing pattern, said circuit controlling means also including means for altering said timing resistance for each conduction of said valve to establish the duration of the successive intervals of said pattern.

18. In combination, a supply circuit, an electronic timer connected for energization from said supply circuit and including an electric discharge device having a pair of principal electrodes and a control member, a capacitor connected in circuit with said supply circuit and said electric discharge device to control the voltage between the control member and one of the principal electrodes of said electric discharge device, a timing circuit for controlling the rate at which the voltage of said capacitance changes from one voltage to another to determine the durations of the intervals between successive conductions of said electric discharge device, said circuit including means for effecting the connection therein of different magnitudes of resistance in succession to establish different predetermined intervals between successive conductions of said electric discharge device, a plurality of relays connected to be energized in succession in response to the successive conductions of said electric discharge device with one additional relay being energized for each conduction of said electric discharge device, and means responsive to operation of said relays for controlling the successive changes in resistance of said timing circuit and for effecting a succession of switching operations in accordance with the time pattern established by the successive operations of said electric discharge device.

19. In combination, a pair of electric discharge devices each including an anode, a cathode and a control member, a supply of direct current voltage, the anode-cathode circuits of said discharge devices being connected in parallel circuits for energization from said supply of direct current voltage, a timing circuit connected with the control member of each of said discharge devices and each including a capacitor connected between the control member of one of said discharge devices and a point the potential of which is controlled by conduction of the other of said discharge devices, so that the time required for the capacitor associated with the control member of one of said discharge devices to charge to a voltage which will render said one of said discharge devices conductive is determined by the magnitude of the resistance connected therewith and the level of voltage of the point to which it is connected, and means controlled by the transfer of current from said one of said discharge devices to the other to effect a change in the magnitude of the resistance connected in circuit with the control member of the other of said discharge devices to control the time required for a subsequent transfer of current between said discharge devices.

MAURICE E. BIVENS.